May 25, 1965     N. A. JOHNSON     3,185,303
HYDRAULIC SYSTEM WITH AUTOMATIC FLOW DIRECTION CONTROL VALVE
Original Filed Feb. 19, 1962     2 Sheets-Sheet 1

INVENTOR.
Nels A. Johnson
BY
Darbo, Robertson + Vanderburgh
Attys.

May 25, 1965  N. A. JOHNSON  3,185,303
HYDRAULIC SYSTEM WITH AUTOMATIC FLOW DIRECTION CONTROL VALVE
Original Filed Feb. 19, 1962  2 Sheets-Sheet 2

INVENTOR.
Nels A. Johnson
BY
Darby, Robertson & Vandenburgh
Att'ys.

United States Patent Office 3,185,303
Patented May 25, 1965

3,185,303
HYDRAULIC SYSTEM WITH AUTOMATIC FLOW
DIRECTION CONTROL VALVE
Nels A. Johnson, Palatine, Ill., assignor of one-half to
George M. Munson, Lombard, Ill.
Continuation of application Ser. No. 173,974, Feb. 19,
1962. This application May 21, 1964, Ser. No. 370,397
12 Claims. (Cl. 210—136)

This application is a continuation of my application Serial No. 173,974, filed February 19, 1962, and now abandoned, which latter application in turn is a continuation-in-part of my application Serial No. 835,475, filed August 24, 1959, and now abandoned.

This invention relates to improvements in hydraulic systems and particularly to the automatic control of the direction of flow of water at the inlet to the system responsive to the location of the discharge from the system. Since one important application of the invention is in water softening systems, it will be described in connection with such a system as a specific example of its structural arrangement and mode of operation.

The principal object of the invention is to provide an automatic flow direction control valve which operates to direct the flow of water supplied under pressure to the valve to the hydraulic system in response to relatively small pressure differentials at the alternate outlet ports of the valve. A further object is to provide such a valve which operates with certainty and reliability and wtih minimum impact of the operating element of the valve with resulting minimum noise and shock to the system. A further object is to provide such a valve which is self-cleaning for dependable and trouble-free operation.

A further object is to provide, as the hydraulic system, water softening apparatus which may be fully automatic in operation and which provides for the positive control of make-up water to the brine tank for the two-fold purpose of establishing the amount of brine supplied during the regeneration cycles and insuring against overflow of the brine tank at any time. In the water softening apparatus, the operating element of the automatic flow direction control valve at the inlet to the apparatus is controlled by hydraulic pressures resulting from either the opening of a soft water faucet or of a valve providing for the discharge of water and brine from the system during regeneration.

Still a further object is to provide in water softening apparatus a means whereby the softener may be by-passed, when desired, and hard water supplied directly to the service outlet.

These and other objects and advantages of the invention will be apparent from the following description, taken together with the accompanying drawing, in which—

Figure 1:
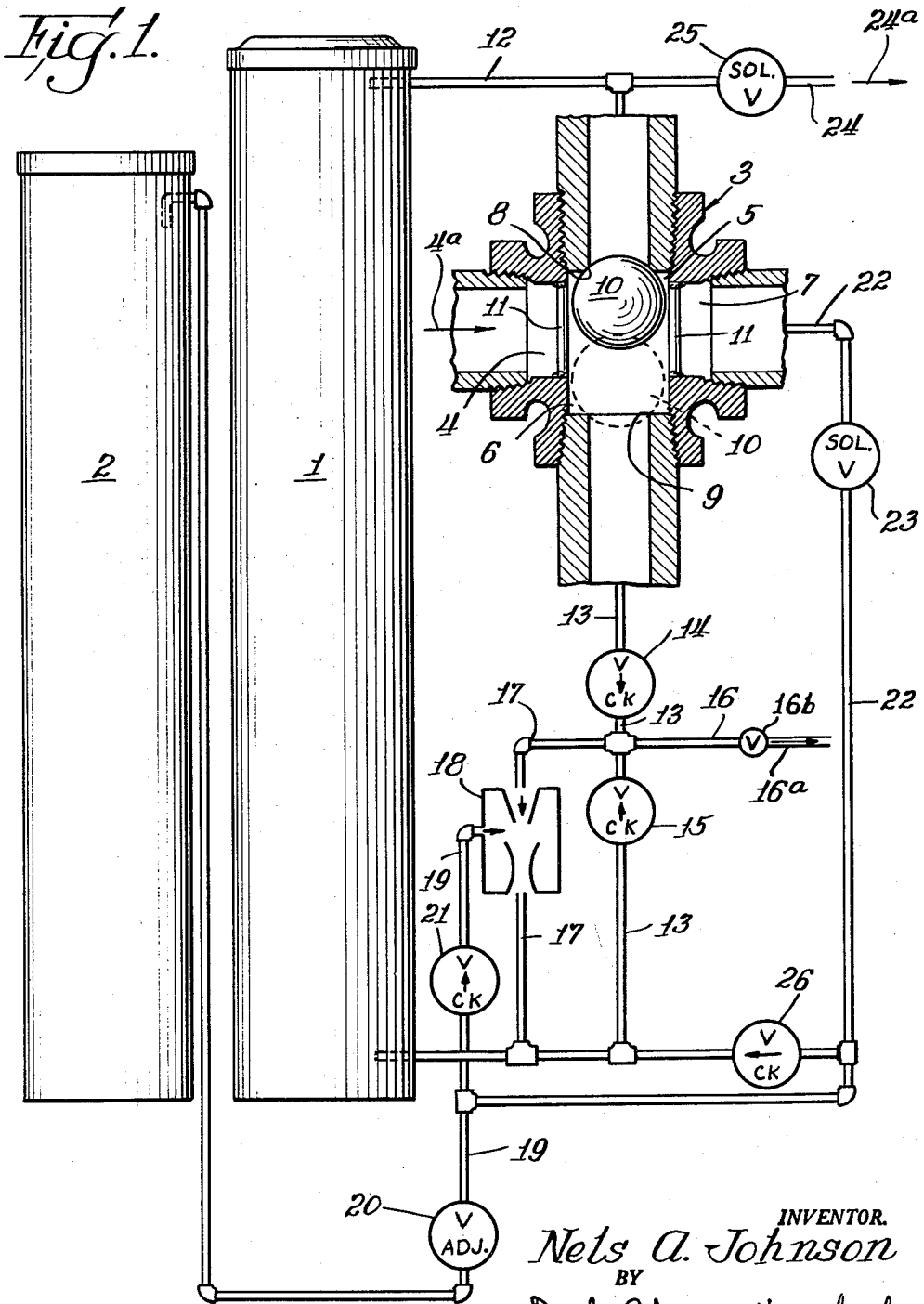
FIG. 1 is a diagrammatic view of the hydraulic system comprising water softening apparatus with the inlet control valve being shown in cross section.

The softener apparatus, illustrated and described by way of specific example of the invention, comprises a softener tank 1 containing a suitable softening material as a base exchange resin, a brine tank 2 containing salt and the salt solution for use in regeneration of the softening material, and a hydraulic system providing the necessary connections, valves, and other equipment needed to operate the softener. Valve 3, shown in cross section in the drawing, controls the direction of flow of water from the hard water line so that it is directed either to the top of the softener tank, as in the normal operation of the softener, or to the bottom of the tank for regeneration of the softening material. This valve is essentially, from the standpoint of function, a three-way valve having an inlet port 4, alternative outlet ports 5 and 6 and, in the particular embodiment illustrated by way of example, another outlet port 7 which is provided at this location in the system merely as a matter of mechanical convenience as a continuous source of supply water for use during the rinse cycle.

In the softener system, hard water under supply line pressure is continuously supplied to the inlet port 4 as is indicated by arrow 4a. Alternate outlet ports 5 and 6 are provided with valve seats 8 and 9, respectively, arranged to cooperate with a valve plug 10 which is free to move between the seats for closing either port 5 or port 6 as required for the functioning of the system. Although a vertical arrangement of the outlet ports and valve seats is shown as preferred for use with the water softener apparatus, satisfactory operation of the valve is obtained with the valve in any position since the movement and position of the valve plug is responsive to the difference in water pressures at the two valve outlet ports resulting from withdrawal of water from the system as hereinafter more fully explained.

The valve plug 10 is preferably spherical in form and it is composed of a material or made hollow so that the mass of the plug is small. For the purpose of this specification, the plug is defined as buoyant. For the purposes of the invention, the significance of the characteristic of buoyancy of the valve plug is twofold: (1) it has low inertia and therefore responds readily to relatively small pressure differentials and strikes the valve seat with negligible impact, and (2) it floats and is therefore normally seated at a port at the top of the valve if a port is provided at this location. An essential condition is that the light ball plug shall be free to move to seat at the outlet port responsive to a pressure differential between the two outlet ports.

Rods 11 are shown arranged diametrically across the ports 4 and 7. The purpose of the rod in port 7 is to prevent the closing of this port by the valve plug at any time. The rod in port 4 is not really necessary since the flow of water through this port is always into the valve, but the rod at this location tends to guide the plug between the two valve seats. Alternatively, a pin extending vertically through the valve plug and through the openings in seats 8 and 9 may be used to serve as a guide in the movement of the plug from one valve seat to the other. If such a guide pin is used, the valve plug may be somewhat elongated, if desired, since the properly rounded surface of the plug will always be guided to the seat by the pin. However, it is generally preferable to employ a freely moving ball since the orientation of the ball upon a valve seat is then haphazard and any spinning movement imparted to the ball by the flow of water past it as the plug moves toward its seat is not restrained with the result that the ball and seats tend to be self-cleaning and the life of the ball is extended.

It will be understood from the foregoing that in the absence of disturbing pressure differentials or water movement brought to bear against the valve plug 10, this buoyant ball is normally seated in the position shown in solid lines in FIG. 1 of the drawing to close the valve outlet port 5. In the position shown in dotted lines, valve outlet port 6 is closed.

The top of softener tank 1 is connected with port 5 of valve 3 by means of tube 12 and the bottom of the softener is connected with the alternative outlet port 6 of the valve by line 13. Check valves 14 and 15 are inserted in tube 13 for purposes hereinafter explained, and a soft water outlet line 16 is connected with line 13 at a point between the check valves 14 and 15, the direction of flow of water being indicated by arrow 16a. An aspirator line 17 is connected in shunt around check valve 15 with tube 13, the brine aspirator 18 being inserted in series in this aspirator line. The brine tank 2 is connected with the throat zone of the aspirator by brine line 19, an adjustable valve 20 and a check valve 21 being connected in the brine line as shown. A rinse and brine make-up water line 22 connects a continuous hard water supply, conveniently at port 7 of valve 3, with brine line 19 between adjustable valve 20 and check valve 21, solenoid valve 23 being connected in line 22 for the control of flow therethrough. To complete the hydraulic system, port 5 of inlet control valve 3 is provided with drain line 24 leading to a sewer or other suitable means for receiving regenerating and rinse liquids, the direction of flow being indicated by arrow 24a. A solenoid valve 25 controls the flow of liquid through the drain line.

A time switch, not shown, is connected with solenoid valves 23 and 25 for activation at predetermined intervals to effect periodic automatic regeneration of the softener. The soft water outlet 16 is, of course, connected with faucets and valves, such as valve 16b, for controlling the flow of soft water for consumption.

In the normal operation of the water softener system during the softening cycle, hard water supplied at port 4 of inlet control valve 3 passes downwardly through the softening reagent material contained within tank 1 and flows through line 13 and outlet line 16 to the point of consumption. It will be apparent that the described path of flow is possible only if port 5 of valve 3 is open, which means that valve plug 10 must be seated at its lowermost position upon seat 9, closing port 6. Prior to the opening of faucet 16b in the consumer line connected with outlet line 16, the buoyant ball plug 10 is ordinarily at rest against seat 8 of inlet control valve 3. Upon opening such a faucet to permit flow of soft water through outlet line 16, the pressure within the body of valve 3, being the zone underlying ball plug 10, is momentarily diminished with the result that the plug is drawn downwardly into contact with seat 9, permitting the flow of hard water to valve outlet port 5 and into tube 12 to the top of the softener. This condition obtains so long as a consumer faucet 16b is open and soft water is withdrawn through the outlet line 16. When the faucet is closed to stop such flow, pressure conditions within the valve 3 are again equalized with the result that valve plug 10 is free to move to its uppermost position upon seat 8 because the plug, including the guide stem 11 and element 11a, is lighter than water and floats. Check valve 14 is not indispensible but is desirably employed to prevent the inertial rush of water toward the valve upon the closing of the faucet.

During the softening cycle, solenoid valves 23 and 24 remain closed.

When the timing mechanism reaches the point at which regeneration of the softener is to be initiated, solenoid valve 25 is opened to permit flow to the sewer or other drain. Since port 5 of inlet control valve 3 is already closed by plug 10 and the opening of valve 25 does not create pressure or flow conditions operative to move the valve plug, but rather, on the other hand, causes some diminishing of pressure immediately above the valve, port 5 remains closed and hard water from the supply is free to flow through the normally open outlet port 6 of the valve. Check valve 15 prevents direct flow to the softener tank through line 13 and the entire flow is diverted through aspirator 18 to the bottom of the softener tank 1. As is well known in the operation of such aspirators, suction is created at the throat of the aspirator and consequently brine from tank 2 is drawn through line 19 and carried with the water into the softener tank.

This salting operation is continued for a period of time sufficient to exhaust the supply of brine available in the brine tank. The timing mechanism having been adjusted to permit the described flow for the interval required to withdraw this predetermined quantity of brine for regeneration of the softener, solenoid valve 23 is then opened to permit the direct flow of hard water at an accelerated rate into the softener to rinse all traces of salt from the softening material. During this rinse cycle, both solenoid valves 23 and 25 are open and make-up water flows back into the brine tank. The rate of flow, and therefore the quantity of make-up water supplied to the brine tank during the interval of the rinse cycle, is controlled by the adjustment of valve 20. The pressure of the hard water supply is taken into account in adjusting this valve so that the amount of make-up water supplied to the brine tank is that quantity which will supply the required amount of brine for the succeeding regeneration of the softener. When the rinsing time has elapsed, both solenoid valves 23 and 25 are closed to return the system to the condition for normal softening of the water.

The purpose of check valve 26 is to prevent the flow of water into the brine tank from line 13 which is always under supply line pressure. Similarly, check 21 prevents the flow of water from the aspirator into the brine tank.

From the foregoing description of the structure and mode of operation of the water softener apparatus and inlet control valve incorporated therein, it will be understood that the valve plug 10 is caused to move from its normal rest position at seat 8 down to the position shown in dotted lines on seat 9 responsive to differential pressures brought to bear against the upper and lower surfaces of the plug.

The frequent movement of the ball plug resulting from operation of the system, including some wiping movement between the plug and the seating surfaces achieves continual cleaning of plug and seat surfaces to thereby assure complete closing of the particular port at which the plug is seated at any given time. Small particles, fibers, and the like, brought in with the supply water, are jarred loose and carried through by the turbulent stream of water passing through the inlet control valve over the surfaces of the plug and seats. Moreover, since the plug in its spherical form is free to rotate in any direction, there is no danger that rings will be worn into the slug as a result of its numerous engagements with the valve seat surfaces. The resulting dependable service of the valve is highly desirable in that it promotes efficiency of the system and minimizes maintenance.

Fully automatic water softener systems of the type herein described are frequently set to regenerate at some time during the very early hours of the morning when there is no demand for water. All members of the household having such an installation are generally asleep at this time. Since, when the vertical arrangement of the valve seats is utilized, the valve plug 10 is normally resting at the position required during the regeneration and rinsing cycles, no movement of the plug takes place during regeneration and, accordingly, the thumping noise which may be caused by such movement and which may be disturbing to sleepers, is entirely avoided.

Although the usual float valve, such as that shown in Johnson Patent No. 2,874,717, may be employed in brine tank 2, this is not necessary in view of the control of make-up water to the brine tank by solenoid valve 23, provided sufficient time is allowed for the regeneration cycle to exhaust all of the brine in the tank. Furthermore, overflowing of the brine tank by an oversupply of make-up water is positively prevented by the certain action of solenoid valve 23. The flow of make-up water to the brine tank is restricted to the period of the rinse cycle whereby the quantity of water, and therefore brine for the succeeding regeneration, may be metered with the proper adjustment of valve 20. If valve 20 is not included in the system, a float valve would be used in the brine tank.

Figure 3:
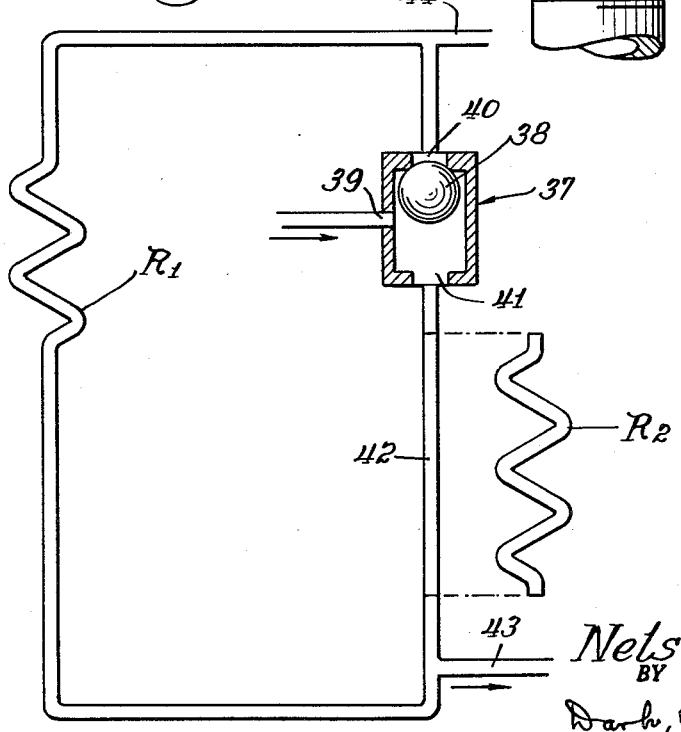
FIG. 3 is a diagrammatic illustration of the hydraulic system for illustrating the principle of operation of the invention.

For the twofold purpose of further explanation of the principles involved in the operation of the automatic flow direction control valve and to describe a further and alternate feature of the invention, reference is made to FIG. 3 of the drawing. A hydraulic system is here schematically illustrated. The hydraulic system is closed in the sense that the entire system shown, including the control valve 37 is always filled with water and no part is open to the atmosphere. A continuous supply of water under pressure is provided at the inlet 39. Ignoring for the moment the part designated $R_2$, the hydraulic system includes an arm wherein flow is relatively restricted. This restriction or resistance to flow is indicated by the zig-zag portion $R_1$. In the water softening apparatus, this restriction is provided by the water softening material in the softener tank.

Control valve 37 is provided with two outlet ports 40 and 41 and contains a spherical valve plug 38. This plug is buoyant and therefore has a low mass and is normally seated at the top of the valve to close outlet port 40 as shown.

The intended function of control valve 37 is to direct the flow of water entering the valve at inlet port 39 to flow through the arm of the hydraulic system containing restriction $R_1$ in one direction or in the opposite direction responsive to the location of the discharge of water from the system. One discharge 43 is connected between outlet port 41 of the valve and the arm containing resistance $R_1$ and the other discharge 44 is connected between outlet port 40 and the arm containing resistance $R_1$. In the water softening apparatus, discharge 43 is the soft water service line and discharge 44 is the discharge to a suitable drain for disposition of the regenerating brine and rinse water.

When water is being withdrawn at neither discharge 43 or 44, the buoyant valve plug 38 is seated at outlet port 40, as shown. The system is static and all points of the system are under supply line pressure. If, now, water is withdrawn at discharge 43 as, for example, when the soft water faucet in water softening apparatus is opened, the pressure in the line 42 connecting outlet port 41 with restriction $R_1$ is momentarily reduced due to the resistance to flow through the restriction $R_1$. Thus, a pressure differential is established within valve 37 between outlet ports 40 and 41 with the result that plug 38 is drawn down to close port 41 and thereby direct the flow of water through outlet port 40 and downwardly through the arm of the hydraulic system containing restriction $R_1$. So long as water is withdrawn at discharge 43, the system is stable in this condition because the pressure within the valve and above the plug will continue to be greater than that in line 42 below the plug.

If, now, discharge 43 is closed, the pressure in the system will equalize and buoyant plug 38 will float to its normal position at outlet port 40. Upon the withdrawal of water at discharge 44 as, for example, in the opening of the discharge to drain in the water softening apparatus, plug 38 is merely held in position at outlet port 40 by the resulting differential in pressure exerted upon the plug. However, if the valve is arranged in horizontal position with respect to the outlet ports, plug 38 would normally be located somewhere between the two outlet ports within the valve and would move to either outlet port responsive to the pressure differential resulting from the withdrawal of water from either discharge 43 or discharge 44.

It has been found in practice that movement of the lightweight plug 38 is positive and immediately responsive to even relatively small motivating pressure differentials. Because of the low mass of the valve plug, impact with the seat to which it is drawn is negligible and causes no noise or shock problems.

For some purposes, as, for example, for the watering of lawns, hard water is entirely satisfactory. In such instances, it is desirable to by-pass the softener and obtain hard water at what is normally the soft water supply line. This may be done, in accordance with the invention, by temporarily inserting a restriction $R_2$ in line 42 of the hydraulic system between outlet port 41 and discharge 43. This restriction should be approximately equal in magnitude to restriction $R_1$ or greater than $R_1$, so that when water is withdrawn at discharge 43, the resistance to flow through restriction $R_2$ from inlet control valve 37 prevents the production of a pressure differential between the outlet ports 40 and 41. There being no motivating pressure applied to plug 38, it remains seated at outlet port 40 and hard water passes directly from inlet 39 to discharge 43.

Figure 2:
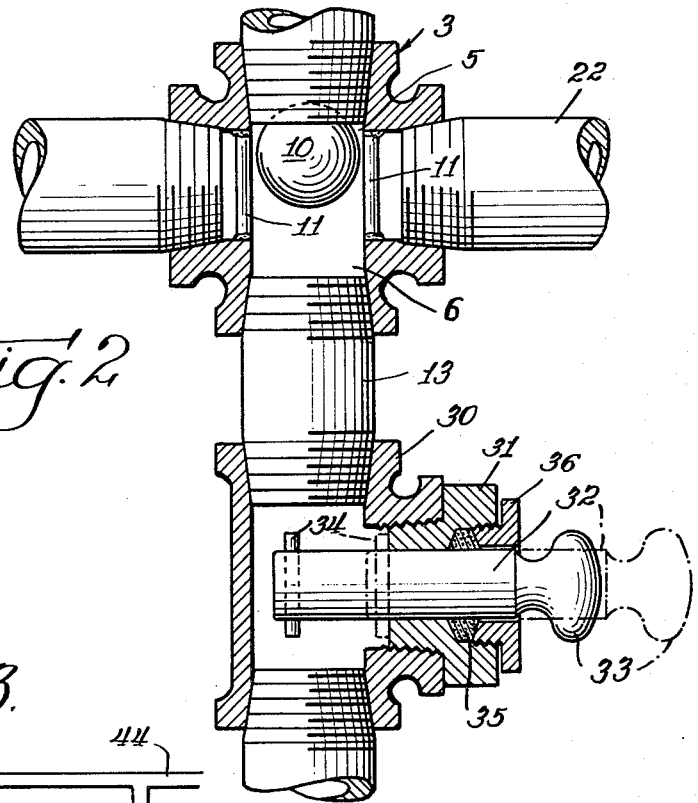
FIG. 2 is a cross-sectional view of a portion of the apparatus showing a novel means for by-passing the softener.

Various means may be employed for the temporary insertion of a restriction $R_2$. One example of a satisfactory device for this purpose is illustrated in FIG. 2. This illustration shows the control valve of FIG. 1 and connected to outlet port 6, comparable with outlet port 41 of the schematic illustration of FIG. 3, is a T 30 into which is threaded a bushing 31. A cylinder 32 having a handle 33 is slidably arranged in the bushing 31 so that it may be manually moved between an inserted position shown in solid lines and a retracted position shown in dot-dash lines. A pin 34 acts as a stop to limit the extent of withdrawal of the cylinder. A packing gland comprising a packing ring 35 and bushing 36 is provided to prevent leakage of water at this fitting.

The size of cylinder 32 and the extent of its insertion into the T are such that the restriction inserted into the line by the cylinder is approximately equal to or greater than the resistance to flow offered by the water softening material in softener tank 1. Under these conditions, as above explained, water withdrawn at what is normally the soft water service line 16 is hard water flowing directly from the hard water supply to the inlet control valve. When a supply of soft water is again desired at the service line, cylinder 32 is retracted and the water softening apparatus is thus returned to normal operation.

Invention is claimed as follows:

1. In a water softener including a softener tank having a bed of softening material therein the improvement comprising: a flow control valve having an upper outlet port, a lower outlet port and an inlet port therebetween, said valve having a valve seat arranged in each said outlet port and a valve plug means adapted to cooperate selectively with the set in each said outlet port to close the same; first connecting means connecting one of said outlet ports with said tank at one end of said bed; and second connecting means connecting the other of said outlet ports with said tank at the other end of said bed and also providing a soft water outlet; the resistance to flow from the one outlet port through the tank to the soft water outlet being substantially greater than the resistance to flow from the other outlet port to the soft water outlet whereby when water is withdrawn from said soft water outlet the pressure at the one outlet port side of the plug means is greater than the pressure at the other outlet port side of the plug means by at least a given pressure differential; said valve plug means being biased to normally contact the seat of and close said one outlet port, the magnitude of the biasing being such as to be overcome by said pressure differential whereby each time water is withdrawn at said water outlet said plug will be moved by said pressure differential to said other outlet port to contact the seat and close the other outlet port.

2. Structure in accordance with claim 1 wherein the valve plug means is spherical and freely movable within the valve for seating upon a valve seat in any rotary orientation.

3. Structure in accordance with claim 2 wherein said one port is said upper port and said other port is said lower port, and said valve plug means is buoyant.

4. Structure in accordance with claim 1 wherein said second connecting means includes means for temporarily introducing flow restricting means into the system between the second outlet port and the soft water outlet to increase the resistance to flow from the other outlet port to the soft water outlet to a magnitude which is at least equal to the resistance from the one outlet port to the soft water outlet, whereby the withdrawal of water at said soft water outlet reduces the pressure at both outlet ports approximately equally and the plug means remains seated upon the valve seat associated with the first outlet port and water from the inlet port is directed through the second outlet port to said soft water outlet.

5. Structure in accordance with claim 4 wherein said first connecting means includes a regeneration discharge and valve means between it and the one outlet port and tank.

6. In water softener apparatus including a softener tank containing water softening material and a brine tank containing salt and a hydraulic system associated with said tank, said hydrulic system comprising an inlet control valve having an inlet port on one side and an upper outlet port and a lower outlet port coaxially vertically located respectively at the upper part and the lower part of said valve, said valve having a valve seat arranged in each said outlet port and a buoyant valve plug adapted to cooperate selectively with the seat in each said outlet port to close the same, means connecting said upper outlet port with the top of said softener tank and also to discharge, a valve interposed between said upper outlet port and the discharge to control only flow to discharge, a line connecting said lower port with the bottom of said softener tank, a soft water outlet connected with said line, the resistance to flow from the upper outlet port through the softener tank to the soft water outlet being greater than the resistance to flow from the lower outlet port directly into said line and to said soft water outlet, and means connecting said brine tank with said line for supplying brine to said line and thence to said softener tank and make-up water from said line to said brine tank as required, the arrangement being such that said buoyant valve plug is normally seated to close the upper outlet port of said control valve and upon withdrawal of water at said soft water outlet the pressure underlying said valve plug is reduced and the plug descends into the low pressure zone within said valve to close the lower outlet port and thereby direct the flow of water entering said control valve through said upper outlet port to the top of said softener tank, whereby said plug is displaced upon each withdrawal of water at said soft water outlet.

7. In water softener apparatus including a softener tank containing water softening material and a brine tank containing salt and an hydraulic system associated with said tanks, said hydraulic system comprising an inlet control valve having an inlet port on one side and an upper outlet port and a lower outlet port coaxially vertically located respectively at the upper part and the lower part of said valve, said valve having a valve seat arranged in each said outlet port and a buoyant valve plug arranged within said valve for free vertical movement between said seats to cooperate selectively with the seat in each said outlet port to close the same, means connecting said upper outlet port with the top of said softener tank and also to discharge, a discharge control valve interposed between said upper outlet port and discharge, a line having two spaced opposing check valves therein connecting said lower port with the bottom of said softener tank, a soft water outlet connected with the line between said two check valves, the resistance to flow from the upper outlet port through the softener tank to the soft water outlet being greater than the resistance to flow from the lower outlet port directly into said line and to said soft water outlet, an aspirator line including an aspirator connected with the line between said two check valves and between said softener and said check valves, a brine line connecting said brine tank with said aspirator at the throat thereof and including a check valve oriented to permit flow toward said aspirator only, a rinse line connected with a hard water supply and with said brine line and having a rinse control valve connected therein, and means connecting said rinse line downstream from said rinse control valve with the bottom of said softener tank and including a check valve oriented to permit flow only toward said tank, the arrangement being such that said buoyant valve plug is normally seated to close the upper outlet port of said inlet valve and upon withdrawal of water at said soft water outlet the pressure underlying said valve plug is reduced and the plug descends into the low pressure zone within said valve to close the lower outlet port and thereby direct the flow of water entering said control valve through said upper outlet port to the top of said softener tank, whereby said plug is displaced upon each withdrawal of water at said soft water outlet.

8. Apparatus in accordance with claim 7 and including an adjustable valve in the brine line arranged to control the rate of flow of make-up water into the brine tank from the rinse line.

9. Apparatus in accordance with claim 7 wherein the inlet control valve has a fourth port and the rinse line is connected thereto as the hard water supply.

10. In water softening apparatus including a softener tank containing water softening material and a hydraulic system associated with said tank including a connection between the outlet of said tank and the service outlet, the improvement which includes in combination a control valve including a valve housing defining a valve chamber therein, at least three ports positioned in said valve housing communicating with said chamber, two of said ports having valve seats provided therein at their junction with said valve chamber, the third port being a water inlet port, a buoyant valve plug contained within said valve chamber adapted alternatively to engage said valve seats to close said ports, one of said ports having a valve seat being connected to the input of said softener tank, a conduit connected at one end to the other of said ports having a valve seat and at the other end to said service outlet, the resistance to flow from said one port through the softener tank to the service outlet being greater than the resistance to flow from the other port through said conduit to the service outlet, and adjustable means to selectively increase the resistance to flow through said conduit sufficiently so that the resistance to flow to the service outlet therethrough is approximately equal to or greater than the resistance to flow through said softener tank, whereby when said means for restricting flow in said conduit is adjusted to increase said resistance to flow to said extent, removal of water from said service outlet causes said valve plug to close the port connected with said softener tank, permitting hard water from said inlet to flow directly through said conduit to said service outlet, and whereby adjustment of said restricting means to remove the additional restriction produced thereby causes said valve plug to close a port connected with said conduit upon withdrawal of water from said service outlet, restoring normal circulation through said softener tank.

11. Water softening apparatus according to claim 10 wherein said adjustable means for restricting flow through said conduit comprises a cylinder reciprocally and sealingly journaled in an orifice provided in a wall of said conduit.

12. An automatic flow direction control for use with a water softener having two ends with a given resistance to flow therebetween, said softener being adapted to be connected to a supply member supplying water under pressure and to a discharge member having a soft water outlet valve which may be opened and closed with the pressure in the discharge member being less than that in the supply member when the valve is open to create a pressure differential in one direction and greater than that in the supply member immediately upon the closing of the valve to create a pressure differential in the opposite direction, said apparatus including: a flow control valve having two outlet ports and an inlet port, said valve having valve seats in each outlet port, one of said ports being at a higher elevation than the other ports, a spherical valve plug within the valve and movable between said seats to close one or the other of the outlet ports, means connecting the inlet port to the supply member, means connecting a first outlet port to one end of the softener, means connecting the second outlet port to the other end of the softener and to the outlet member and providing a resistance to flow from the second outlet port to the outlet member sufficiently less than said given resistance to seat the plug securely in closing position on the seat of the second outlet port when said outlet valve is open, said plug having a sufficiently low weight in relation to its size to be buoyant with the plug being urged against said one elevated seat by a force sufficiently low to be overcome by the pressure differential acting on it in a direction such that the plug is urged away from the one seat, whereby said plug is moved away from said one seat substantially each time that the outlet valve is opened and said plug is returned to said one seat when the outlet valve is reclosed.

References Cited by the Examiner

UNITED STATES PATENTS

| | | | |
|---|---|---|---|
| 2,237,014 | 4/41 | Stoehrer | 137—112 |
| 2,715,098 | 8/55 | Whitlock | 210—191 X |
| 2,751,347 | 6/56 | Miller | 210—140 X |

REUBEN FRIEDMAN, *Primary Examiner.*